(No Model.)

E. ANTHONY.
Geometrical Puzzle.

No. 237,464.          Patented Feb. 8, 1881.

Witnesses:          Inventor:

UNITED STATES PATENT OFFICE.

EDWYN ANTHONY, OF HEREFORD, COUNTY OF HEREFORD, ENGLAND.

GEOMETRICAL PUZZLE.

SPECIFICATION forming part of Letters Patent No. 237,464, dated February 8, 1881.

Application filed November 12, 1880. (No model.)

*To all whom it may concern:*

Be it known that I, EDWYN ANTHONY, of Hereford, in the county of Hereford, England, have invented a new and useful Device in Geometrical Puzzles, of which the following is a specification.

My invention relates to that class of devices in which, by means of several pieces of wood, card-board, or other suitable material of different shapes, square figures of different sizes can be formed.

My invention consists of eight right-angled triangles, composed of wood, metal, cardboard, or other suitable material, each triangle bearing to the other triangles a certain relation, as hereinafter described.

Figure 1:
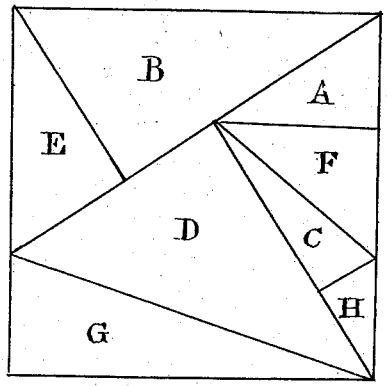
Figure 2:
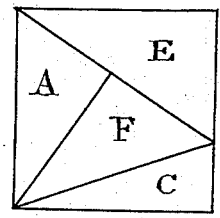
Figure 2:
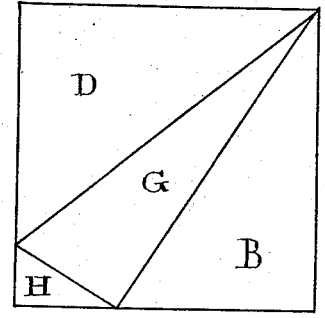
Figure 3:
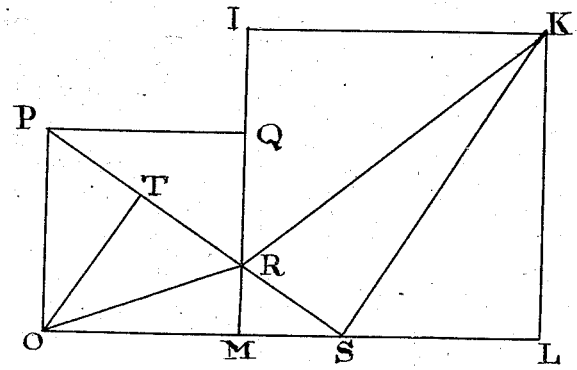

Figure 1 shows the eight triangles of my invention arranged to form a square. Fig. 2 shows the same triangles arranged to form two squares. Fig. 3 shows my manner of constructing the triangles so as to obtain the result required.

In Fig. 1 the eight triangles are lettered, and in Fig. 2 the same triangles bear the same letters, so as to show the arrangement thereof.

In Fig. 3, which shows my method of constructing the triangles, I take any two squares, I K L M and O P Q M, arranged as shown. On O L, I make O S equal to M L, and join P S and K S, and join the point R where the lines P S and I M intersect each other with the points O and K, and from O let fall the perpendicular O T upon P S. The eight right-angled triangles composing the two squares can then be used to compose the square, as shown in Fig. 1.

What I claim is—

The employment or use, in a puzzle, of eight right-angled triangles, bearing a certain relation to each other in shape and size, dependent upon their construction, substantially as and for the purposes hereinbefore shown and described.

EDWYN ANTHONY.

Witnesses:
J. L. BUTTERLY,
HENRY HAMMEL.